`US008091577B2`

(12) United States Patent
Matsuzaki et al.

(10) Patent No.: US 8,091,577 B2
(45) Date of Patent: Jan. 10, 2012

(54) VALVE (75) Inventors: Takeharu Matsuzaki, Kariya (JP); Shigeto Nakajima, Nagano (JP)

(73) Assignees: Kabushiki Kaisha Toyota Jidoshokki, Aichi-Ken (JP); Nishina Industrial Co., Ltd., Nagano-Ken (JP)

( * ) Notice: Subject to any disclaimer, the term of this patent is extended or adjusted under 35 U.S.C. 154(b) by 963 days.

(21) Appl. No.: 11/667,049

(22) PCT Filed: Nov. 8, 2005

(86) PCT No.: PCT/JP2005/020779
§ 371 (c)(1),
(2), (4) Date: Mar. 11, 2008

(87) PCT Pub. No.: WO2006/049346
PCT Pub. Date: May 11, 2006

(65) Prior Publication Data
US 2008/0163947 A1 Jul. 10, 2008

(30) Foreign Application Priority Data

Nov. 8, 2004 (JP) ................................. 2004-323230

(51) Int. Cl.
*G05D 11/00* (2006.01)
(52) U.S. Cl. ......... 137/115.26; 137/118.06; 137/601.31; 91/446
(58) Field of Classification Search .................. 137/505, 137/496, 494, 111, 500, 503, 505.15, 505.25, 137/883, 110, 115.21, 115.26, 118.06, 601.13; 91/446; 60/459, 468; 251/153, 167, 158, 251/175, 325, 337
See application file for complete search history.

(56) References Cited

U.S. PATENT DOCUMENTS
2,211,846 A * 8/1940 Brown ........................... 137/494
(Continued)

FOREIGN PATENT DOCUMENTS
DE          100 65 428          7/2001
(Continued)

OTHER PUBLICATIONS

International Search Report for corresponding International PCT application No. PCT/JP2005/020779, dated Feb. 7, 2006.
(Continued)

*Primary Examiner* — John Rivell
*Assistant Examiner* — Minh Le
(74) *Attorney, Agent, or Firm* — Locke Lord LLP (57) ABSTRACT

A valve seat 20 is arranged between the supply circuit 8 and a downstream circuit 18. A valve body 21 blocks a fluid flow between the supply circuit 8 and the downstream circuit 18 by contacting the valve seat 20. The valve body 21 connects the supply circuit 8 to the downstream circuit 18 for supplying the fluid to the downstream circuit 18 by separating from the valve seat 20. A through hole 24 extends through the valve body 21 and thus defines a part of the supply circuit 8. The through hole 24 is defined in such a manner that the fluid that has flowed from the through hole 24 proceeds between the valve seat 20 and the valve body 21 and is thus supplied to the downstream circuit 18. The valve body 21 is formed in such a manner that a pressure receiving area at an upstream side of the through hole 24 is smaller than a pressure receiving area at a downstream side of the through hole 24. This reduces a pressure loss caused by the fluid passing through a backflow prevention structure that permits forward fluid flow from the supply circuit 8 to the downstream circuit 18 but prohibits backflow of the fluid.

17 Claims, 6 Drawing Sheets

U.S. PATENT DOCUMENTS

| | | | | |
|---|---|---|---|---|
| 2,797,700 | A * | 7/1957 | McGowen, Jr. | 137/155 |
| 3,060,959 | A * | 10/1962 | Foster | 137/498 |
| 3,608,859 | A * | 9/1971 | Hetzer | 251/63.4 |
| 3,905,382 | A * | 9/1975 | Waterston | 137/102 |
| 4,128,108 | A * | 12/1978 | Parker et al. | 137/327 |
| 4,176,680 | A * | 12/1979 | de Launay | 137/496 |
| 4,453,561 | A * | 6/1984 | Sands | 137/327 |
| 4,518,006 | A * | 5/1985 | Hoffmann et al. | 137/218 |
| 4,791,950 | A * | 12/1988 | Pedersen | 137/115.26 |
| 4,919,166 | A | 4/1990 | Sims | |
| 5,050,636 | A * | 9/1991 | Sagawa et al. | 137/494 |
| 5,159,813 | A * | 11/1992 | Yoshimatsu et al. | 60/459 |
| 5,651,390 | A * | 7/1997 | Ishihama et al. | 137/596 |
| 5,950,429 | A * | 9/1999 | Hamkins | 60/422 |
| 6,945,272 | B2 * | 9/2005 | Modro et al. | 137/529 |
| 7,114,518 | B2 * | 10/2006 | Kirby | 137/504 |
| 7,882,777 | B2 * | 2/2011 | Matsuzaki et al. | 91/446 |
| 2007/0056633 | A1 * | 3/2007 | Zimpfer et al. | 137/494 |

FOREIGN PATENT DOCUMENTS

| | | |
|---|---|---|
| GB | 1 306 812 | 2/1973 |
| JP | 11-315803 | 11/1999 |
| JP | 2002-327706 | 11/2002 |
| TW | 467266 | 12/2001 |
| TW | 539083 | 6/2003 |
| TW | 563758 | 11/2003 |

OTHER PUBLICATIONS

Chinese Office Action dated Mar. 2, 2007 with Search Report, received in corresponding Chinese Patent Application No. 094138966 without English translation.

* cited by examiner

VALVE

FIELD OF THE INVENTION

The present invention relates to backflow preventing structures that permit forward flow of fluid from a supply circuit located upstream to a downstream circuit located downstream but prohibit backflow of the fluid from the downstream circuit to the supply circuit.

BACKGROUND OF THE INVENTION

Conventionally, a valve structure forming a check valve that permits forward flow of fluid from an upstream supply circuit to a downstream circuit but prohibits backflow of the fluid from the downstream circuit to the supply circuit has been often used, as has been described in, for example, Japanese Laid-Open Patent Publication Nos. 2002-327706 and 11-315803. Each of these documents describes a hydraulic circuit having a check valve that permits forward flow but prohibits backflow. Particularly, Japanese Laid-Open Patent Publication No. 2002-327706 specifically describes a valve structure forming a typical check valve, which has been often employed in the conventional art, referring to FIG. 3. The valve structure (a load check valve 42) is incorporated in a hydraulic circuit provided in a forklift, as arranged between a pump port defining a part of a supply circuit and a downstream circuit leading to a lift cylinder. When a valve body separates from a valve seat, hydraulic pressure is supplied from the supply circuit to the downstream circuit. When the valve body is received by the valve seat, the valve body prevents backflow from the downstream circuit to the supply circuit.

In this valve structure, when the pressure of the hydraulic fluid in the supply circuit is relatively high, the pressure acts to separate the valve body from the valve seat. In contrast, when the pressure of the hydraulic fluid in the downstream circuit is relatively high, the pressure acts to bring the valve body in contact with the valve seat, thus blocking the corresponding fluid passage. In other words, the check valve of this valve structure is formed simply by arranging the valve seat and the valve body between the supply circuit and the downstream circuit. The valve body is allowed to selectively contact the valve seat or separate from the valve seat, thus switching the corresponding passage between a connected state and a blocked state. This restricts the shape of the passage between the supply circuit and the downstream circuit and the dimensions of the valve seat and the valve body, which are formed in correspondence with the shape of the aforementioned passage. Therefore, such dimensions and shape cannot be largely modified even if such modification is required for reducing pressure loss caused by fluid passing through the check valve formed by the valve structure. It is thus difficult to decrease the pressure loss effectively.

SUMMARY OF THE INVENTION

Accordingly, it is an objective of the present invention to provide a valve structure, a valve unit, and a hydraulic circuit capable of reducing pressure loss caused by fluid passing through a backflow preventing structure that permits forward fluid flow from a supply circuit to a downstream circuit but prohibits backflow.

To achieve the foregoing and other objectives of the present invention, a valve structure permitting forward flow of a fluid from an upstream supply circuit to a downstream circuit but prohibiting backflow of the fluid from the downstream circuit to the supply circuit is provided. The valve structure includes a valve seat, a valve body, and a through hole. The valve seat is arranged between the supply circuit and the downstream circuit. The valve body blocks a flow of the fluid between the supply circuit and the downstream circuit by contacting the valve seat. The valve body connects the supply circuit to the downstream circuit for supplying the fluid to the downstream circuit by separating from the valve seat. The through hole extends through the valve body and defining a part of the supply circuit. The through hole is defined in such a manner that the fluid that has passed through the through hole flows in the space between the valve seat and the valve body and is thus supplied to the downstream circuit. The valve body is formed in such a manner that a pressure receiving area at an upstream side of the through hole is smaller than a pressure receiving area at a downstream side of the through hole.

The present invention also provides a valve unit including a housing and a passage. The housing incorporates the above described valve structure. The passage is provided separately from the through hole in such a manner as to merge a flow of the fluid sent from the through hole with a flow of the fluid in the passage. The passage defines a part of the supply circuit.

Further, the present invention provides a hydraulic circuit including the above described valve unit, the supply circuit, and the downstream circuit.

Other aspects and advantages of the invention will become apparent from the following description, taken in conjunction with the accompanying drawings, illustrating by way of example the principles of the invention.

DETAILED DESCRIPTION OF THE PREFERRED EMBODIMENTS

A best mode for carrying out the present invention will hereafter be described with reference to the attached drawings. A valve structure according to an embodiment of the present invention can be generally employed as a backflow preventing structure that permits forward flow of fluid from an upstream supply circuit to a downstream circuit but prohibits backflow of the fluid from the downstream circuit to the supply circuit. A valve unit and a hydraulic circuit according to the embodiment can be generally used in the valve structure. Although the embodiment will be explained for a case in which the present invention is applied to a loading device of a forklift by way of example, the present invention is not limited to this. The present invention may be applied generally to different purposes other than the loading device of the forklift.

Figure 1:
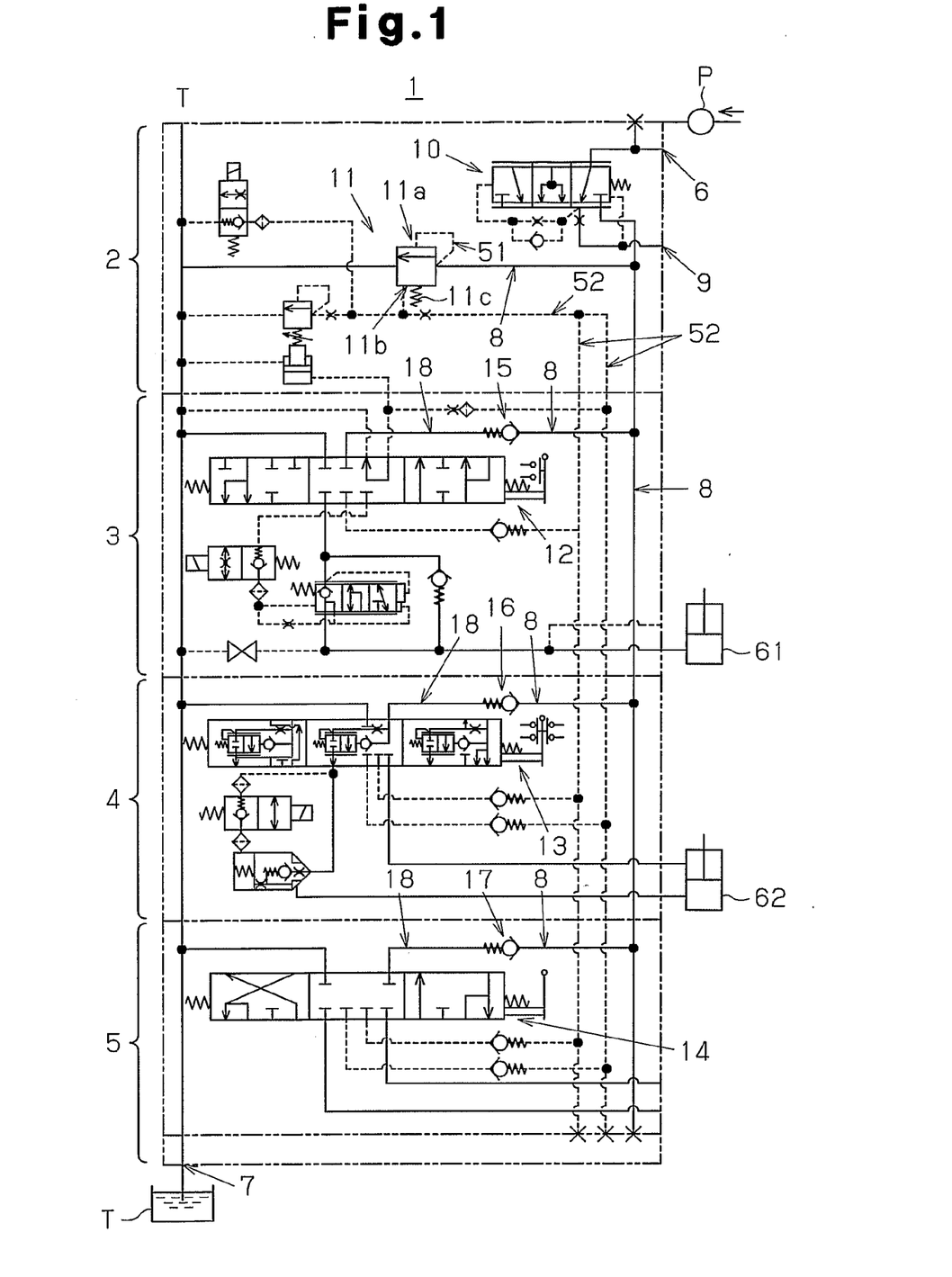
FIG. 1 is a circuit diagram representing a hydraulic circuit according to an embodiment of the present invention.
Figure 2:
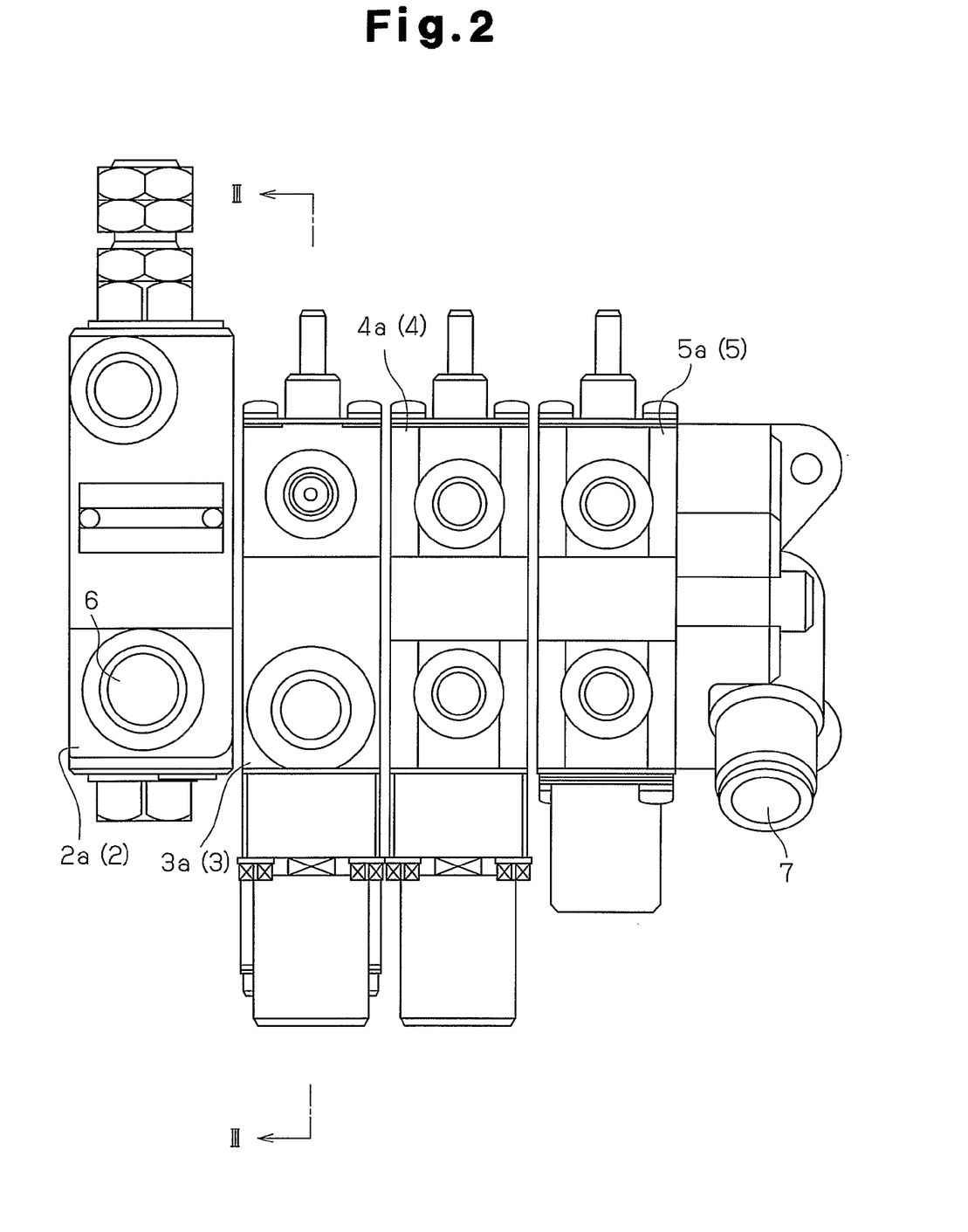
FIG. 2 is a plan view showing the hydraulic circuit of FIG. 1.

FIG. 1 is a circuit diagram representing, a hydraulic circuit according to the embodiment of the present invention and FIG. 2 is a plan view showing the hydraulic circuit. As shown in FIGS. 1 and 2, the hydraulic circuit 1 is applied to a loading device (not shown) of a forklift and includes an inlet valve unit 2 and valve units 3, 4, 5 of the illustrated embodiment. A pump port 6 connected to a hydraulic pump P is defined in a housing 2a of the inlet valve unit 2. In the hydraulic circuit 1, these valve units 2 to 5 are arranged continuously (see FIG. 2).

The valve unit 3 operates to control operation of a lift cylinder 61, which is a hydraulic actuator, and includes a housing 3a (hereinafter, referred to as a "lift housing 3a"), referring to FIG. 2. The valve unit 4 operates to control operation of a tilt cylinder 62, which is a hydraulic actuator, and includes a housing 4a. The valve unit 5 is provided for an attachment and includes a housing 5a and a tank port 7 communicating with a tank T. The housings 2a to 5a are formed through casting.

As shown in FIG. 1, the valve unit 2 incorporates a supply circuit 8, a priority flow port 9, and a flow divider 10. The supply circuit 8 supplies hydraulic fluid from the hydraulic pump P. The priority flow port 9 is connected to a non-illustrated power steering circuit (a priority flow circuit). The flow divider 10 is arranged between the supply circuit 8 and the priority flow port 9 for adjusting the flow rate of the corresponding flow and thus dividing the flow. Further, the valve unit 2 has a pressure compensation valve 11 for switching a connected/disconnected state between the supply circuit 8 and the tank T, thus adjusting the rate of the flow returned to the tank T (or, the rate of the flow supplied to the supply circuit 8).

As shown in FIG. 1, each of the valve units 3, 4, 5 includes a switch valve 12, 13, 14 and a check valve 15, 16, 17 for controlling operation of the hydraulic actuator, to which a prescribed port of the respective valve unit 3, 4, 5 is connected. Each of the check valves 15 to 17 is incorporated in the housing 3a to 5a of the corresponding valve unit 3 to 5. Each valve 15 to 17 forms the valve structure of the illustrated embodiment that permits forward flow of hydraulic fluid from the supply circuit 8 located upstream to a downstream circuit 18 but prohibits backflow of the fluid from the downstream circuit 18 to the supply circuit 8. That is, the hydraulic circuit 1 includes the multiple valve units 3 to 5 having the corresponding check valves 15 to 17, the supply circuit 8 to which the hydraulic fluid is fed from the pump P, the downstream circuit 18 in which the switch valves 12 to 14 are provided for controlling the supply of the hydraulic fluid to the hydraulic actuators, and the pressure compensation valve 11. In the illustrated embodiment, the downstream circuit 18 is defined as a loading system including the hydraulic actuators.

As shown in FIG. 1, the pressure compensation valve 11 of the valve unit 2 includes a first pilot chamber 11a and a second pilot chamber 11b. The first pilot chamber 11a receives the pressure of the hydraulic fluid in a first passage 51 into which the hydraulic fluid flows from the supply circuit 8 before reaching the switch valves 12 to 14. Contrastingly, the second pilot chamber 11b receives the pressure of the hydraulic fluid in the second passage 52 into which the hydraulic fluid flows from the downstream circuit 18 after passing through the switch valves 12 to 14. The second pilot chamber 11b also receives the urging force of a spring 11c. In correspondence with the urging force generated by the first pilot chamber 11a and the urging force generated by the second pilot chamber 11b, the pressure compensation valve 11 controls the rate of the flow supplied to the switch valves 12 to 14. In other words, the pressure compensation valve 11 switches the connected/disconnected state between the supply circuit 8 and the tank T in correspondence with the urging force generated by the first pilot chamber 11a and the urging force generated by the second pilot chamber 11b, thus controlling the rate of the flow supplied to the switch valves 12 to 14. Therefore, if load is applied to the downstream circuit 18, or a loading circuit, the urging force caused by the second pilot chamber 11b is increased. The pressure compensation valve 11 thus operates to reduce the rate of the hydraulic fluid flowing from the supply circuit 8 to the tank T. In this manner, the hydraulic fluid is supplied to the supply circuit 8 reliably in correspondence with the load applied to the loading system.

Figure 3:
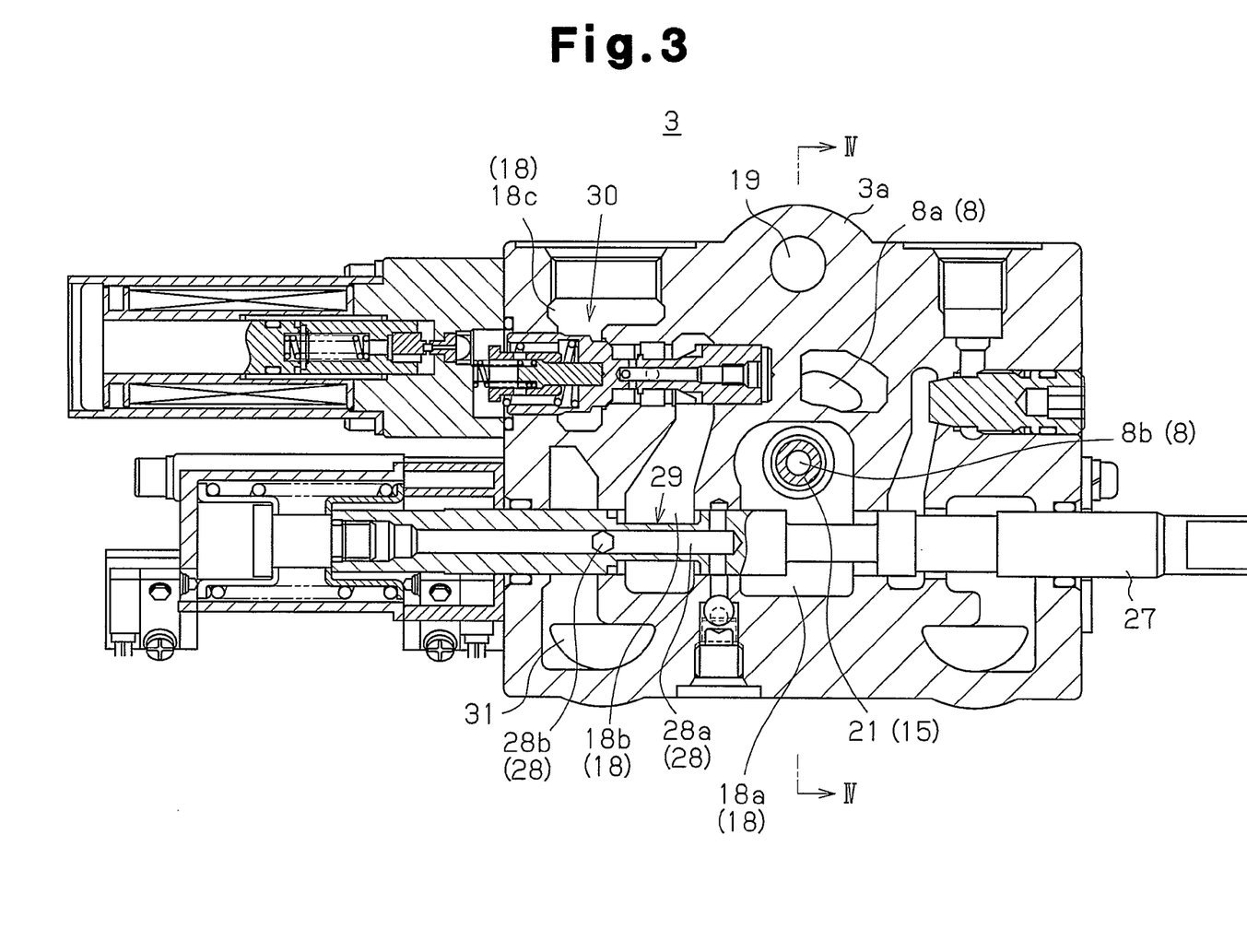
FIG. 3 is a cross-sectional view showing a valve unit of the hydraulic circuit of FIG. 1, as taken along line III-III of FIG. 2.
Figure 4:
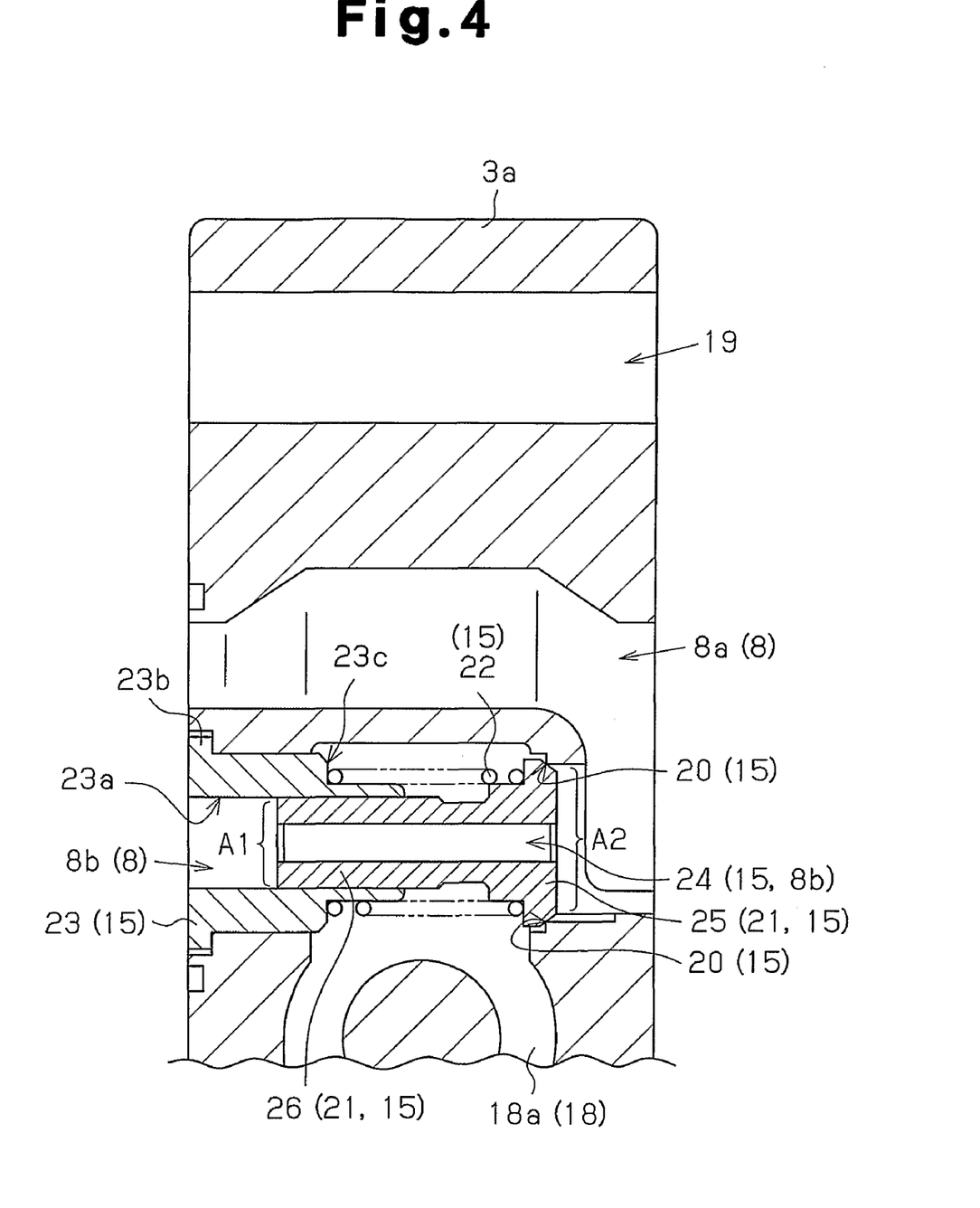
FIG. 4 is a cross-sectional view taken along line IV-IV of FIG. 3.

The valve structure of the illustrated embodiment will hereafter be described in detail. The description will focus on the check valve 15 of the valve unit 3, by way of example. FIG. 3 shows the valve unit 3 in cross section taken along line in the lift housing 3a of FIG. 2. FIG. 4 is a cross-sectional view showing a portion of the lift housing 3a taken along line IV-IV of FIG. 3. The check valves 16, 17 provided in the other housings 4a, 5a are configured identical to the check valve 15.

As shown in FIGS. 3 and 4, the lift housing 3a accommodating the check valve 15 has a bolt hole 19 like the other housings 2a, 4a, 5a. The valve units 2 to 5 are arranged continuously by fixedly fastening the valve units 2 to 5 together by means of a bolt (not shown) passed through the bolt holes 19 of the valve units 2 to 5. Further, a passage defining a part of the supply circuit 8 and a passage defining a part of the downstream circuit 18 are defined in the lift housing 3a. That is, as shown in FIGS. 3 and 4, passages 8a, 8b (hereinafter, referred to also as "supply circuit sections 8a, 8b") each defining a part of the supply circuit 8 and passages 18a, 18b, 18c (hereinafter, referred to also as "downstream circuit sections 18a, 18b, 18c") each defining a part of the downstream circuit 18 are defined in the lift housing 3a.

As shown in FIG. 4, the check valve 15 has a valve seat 20, a valve body 21, a spring 22, a guide member 23, and a through hole 24. The valve seat 20 is formed integrally with the lift housing 3a and arranged between the supply circuit 8 and the downstream circuit 18. The valve body 21 includes a seat portion 25 and a hollow cylindrical body portion 26. The valve body 21 contacts the valve seat 20 through the seat portion 25. The diameter of the body portion 26 is smaller than the diameter of the seat portion 25. When received by the valve seat 20, the valve body 21 blocks the flow of the hydraulic fluid between the supply circuit 8 and the downstream circuit 18. When separated from the valve seat 20, the valve body 21 connects the supply circuit 8 to the downstream circuit 18, thus supplying the hydraulic fluid to the downstream circuit 18. As shown in FIG. 4, the valve body 21 is configured in such a manner that a pressure receiving area A1 at an upstream end of the through hole 24 is smaller than a pressure receiving area A2 at a downstream end of the through hole 24.

The through hole 24 extends through the interior of the valve body 21 and defines a part of the supply circuit section 8b (the supply circuit 8). The through hole 24 is defined in such a manner that the hydraulic fluid that has passed through the through hole 24 flows in the space between the valve seat 20 and the valve body 21 and is thus supplied to the downstream circuit 18 (the downstream circuit section 18a). Also, the through hole 24 corresponds to a recess defined by the hollow cylindrical body portion 26, extending parallel with a direction in which the valve body 21 moves toward the valve seat 20.

The guide member 23 is formed by an annular member and has an insertion hole 23a through which the valve body 21 is inserted into the guide member 23 in such a manner that the valve body 21 is slidably received by the guide member 23. An end portion 23b of the guide member 23 is abutted by the lift housing 3a and held in position by, for example, being pressed by the housing 2a adjacent to the lift housing 3a. Alternatively, the guide member 23 may be secured directly to the lift housing 3a.

The spring 22 is arranged in such a manner as to urge the valve body 21 toward the valve seat 20 and forms an elastic member of the illustrated embodiment. The spring 22 is formed as a coil spring arranged spirally around the valve body 21. The spring 22 is arranged between a stepped portion 23c formed in the outer circumference of the guide member 23 and the seat portion 25 of the valve body 21. This arrangement allows the spring 22 to urge the valve body 21 toward the valve seat 20 with respect to the guide member 23.

For installing the valve body 21, the spring 22, and the guide member 23 in the lift housing 3a, the valve body 21, the spring 22, and the guide member 23 are inserted into the lift housing 3a altogether or separately in this order, from an upstream side to a downstream side of the hydraulic circuit 1 (in a direction in which the valve body 21 moves toward the valve seat 20). In this manner, the valve body 21, the spring 22, and the guide member 23 are smoothly installed in the lift housing 3a without interfering with the lift housing 3a.

Referring to FIG. 4, in the lift housing 3a incorporating the check valve 15, the passage 8a is provided separately from the through hole 24 (the passage 8b). The passage 8a merges the flow of the hydraulic fluid sent from the through hole 24 with the flow of the hydraulic fluid in the passage. Further, the check valves 15 to 17, which are incorporated in the corresponding valve housings 3a to 5a arranged continuously, are provided parallel with one another. For example, the check valve 16, 17 and the through hole of each of the housings 4a, 5a other than the lift housing 3a are arranged coaxially with the check valve 15 and the through hole 24.

The operation of the check valve 15 will now be described. For example, if supply of the hydraulic fluid from the downstream circuit section 18a to the lift cylinder 61 is suspended like in a case in which the lift cylinder 61 is in a standby state, the urging force of the spring 22 urges the valve body 21 toward the valve seat 20 and thus maintains the valve body 21 in a state received by the valve seat 20, referring to FIG. 4. That is, the check valve 15 is held in a state disconnecting the supply circuit 8 (the supply circuit sections 8a, 8b) from the downstream circuit 18 (the downstream circuit section 18a). This prevents the hydraulic fluid in the downstream circuit section 18a from flowing into the space between the valve body 21 and the valve seat 20 and thus reaching the supply circuit 8. The supply circuit section 8a and the supply circuit section 8b communicate with the supply circuit 8 in the housing 2a, to which the lift housing 3a is located adjacent at an upstream side. The supply circuit sections 8a, 8b communicate also with the supply circuit 8 in the housing 4a, to which the lift housing 3a is located adjacent at a downstream side.

Figure 5:
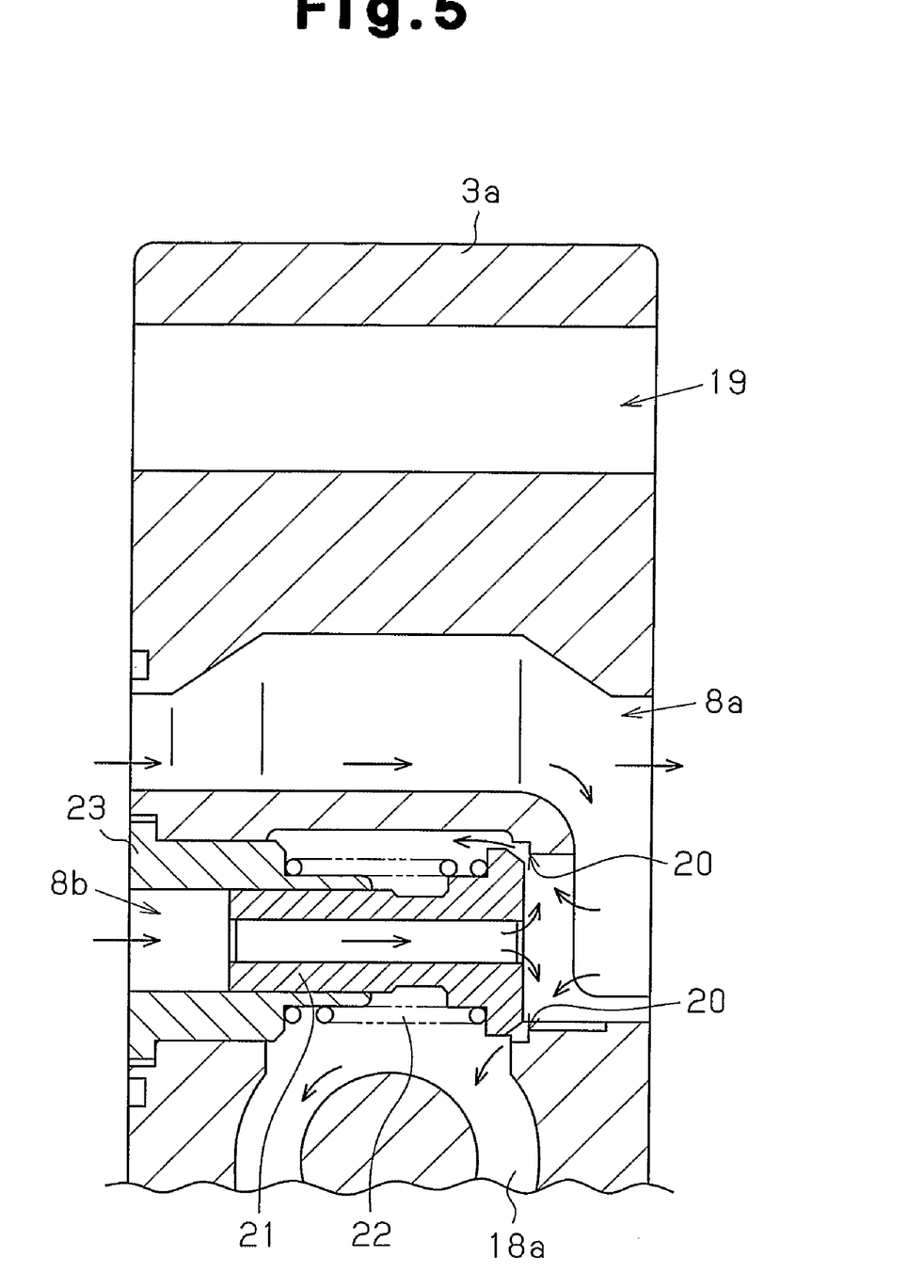
FIG. 5 is a cross-sectional view for explaining operation of the valve structure of FIG. 4.

When the switch valve 12 is operated and load is applied to the lift cylinder 61, the pressure of the hydraulic fluid in the supply circuit 8 (the supply circuit sections 8a, 8b) is raised through the aforementioned operation of the pressure compensation valve 11. In this state, the through hole 24 of the valve body 21 connects the upstream side to the downstream side with respect to the valve body 21. The pressure acting in the upstream side is equal to the pressure acting in the downstream side. As has been described, the valve body 21 is configured in such a manner that the downstream pressure receiving area A2 is larger than the upstream pressure receiving area A1. The pressure of the hydraulic fluid in the supply circuit 8 thus acts to urge the valve body 21 away from the valve seat 20. That is, the urging force caused by the hydraulic fluid in correspondence with the difference between the pressure receiving areas A1, A2 acts to move the valve body 21 away from the valve seat 20 against the urging force of the spring 22. Therefore, the state shown in the cross-sectional view of FIG. 4 is switched to the state shown in the cross-sectional view of FIG. 5, in which the hydraulic fluid flows as indicated by the arrows in the drawing. In other words, the valve body 21 separates from the valve seat 20 when the urging force caused by the hydraulic fluid in correspondence with the difference between the pressure receiving areas A1, A2 is increased. This connects the supply circuit sections 8a, 8b to the downstream circuit 18a, thus allowing the hydraulic fluid to pass between the valve body 21 and the valve seat 20. The hydraulic fluid is thus supplied to the downstream circuit section 18a.

That is, the check valve 15 is formed by the valve structure that permits the forward flow of the hydraulic fluid from the supply circuit 8 to the downstream circuit 18 but prohibits the backflow from the downstream circuit 18 to the supply circuit 8.

The operation of the valve unit 3 will hereafter be described briefly referring to FIG. 3. When the lift cylinder 61 is actuated and the switch valve 12 is operated so as to lift an object (see FIG. 1), a spool 27 moves rightward as viewed in FIG. 3 (with the bolt hole 19 defined as located upside). In this state, after having been supplied from the supply circuit 8 (the supply circuit sections 8a, 8b) to the downstream circuit section 18a through the check valve 15 (see FIG. 5), the hydraulic fluid flows into fluid passages 28 (28a, 28b) defined in the spool 27 via which the hydraulic fluid is sent from the downstream circuit section 18a to the downstream circuit section 18b. The hydraulic fluid then reaches a flow regulator 30 and is thus sent from the downstream circuit section 18c to the lift cylinder 61. As the spool 27 moves further rightward as viewed in the drawing, the hydraulic fluid that has been supplied to the downstream circuit section 18a via the check valve 15 is sent to the downstream circuit section 18b through a small diameter portion 29 defined in the spool 27. The hydraulic fluid is then supplied to the lift cylinder 61 through the flow regulator 30 and the downstream circuit section 18c. Contrastingly, when the switch valve 12 is operated in such a manner as to lower the object, the spool 27 moves leftward, as viewed in FIG. 3. This causes the hydraulic fluid that has been supplied from the lift cylinder 61 to move to the downstream circuit section 18c, the flow regulator 30, the downstream circuit section 18b, and the small diameter portion 29, thus reaching a tank passage 31 communicating with the tank T. The hydraulic fluid is thus returned to the tank T.

As has been described, each of the check valves 15 to 17, which is the valve structure according to the illustrated embodiment, disconnects the supply circuit 8 from the downstream circuit 18 by bringing the valve body 21 into contact with the valve seat 20 but connects the supply circuit 8 to the downstream circuit 18 by separating the valve body 21 from the valve seat 20. The valve body 21 has the through hole 24 defining a part of the supply circuit 8. The upstream side and the downstream side with respect to the through hole 24 communicate with each other and, thus, equal pressure acts in the upstream side and the downstream side. This allows the valve body 21 to move toward the upstream side at which the pressure receiving area A1 is relatively small, thus separating the valve body 21 from the valve seat 20. In this state, the hydraulic fluid that has passed through the through hole 24 of the valve body 21 is supplied to the downstream circuit 18 through the space between the valve body 21 and the valve seat 20. In contrast, when the valve body 21 is held in contact with the valve seat 20, the valve body 21 is prevented from separating from the valve seat 20 due to the hydraulic fluid supplied from the downstream circuit 18. The each of check valves 15 to 17 thus permits only the forward flow of the fluid from the supply circuit 8 to the downstream circuit 18. Further, since each of the check valves 15 to 17 allows the hydraulic fluid to flow through the through hole 24 defined in the valve body 21, the supply circuit 8 (the supply circuit section 8b) is reliably held in a communicating state by efficiently using the space in which the valve body 21 is arranged. This reduces pressure loss caused by the hydraulic fluid that is supplied from the supply circuit 8 to the downstream circuit 18 through the check valve 15 to 17. In this manner, a valve structure capable of reducing pressure loss caused by hydraulic fluid passing through a backflow preventing structure, which permits forward flow from the supply circuit 8 to the downstream circuit 18 but prohibits backflow, is obtained.

Since the spring 22 urges the valve body 21 toward the valve seat 20 in each check valve 15 to 17, the valve body 21 is further reliably brought into contact with the valve seat 20, thus preventing backflow. When the pressure of the hydraulic fluid in the supply circuit 8 rises, the valve body 21 is separated from the valve seat 20 by the urging force caused by the hydraulic fluid in correspondence with the difference between the pressure receiving area A1 at the upstream end of the through hole 24 and the pressure receiving area A2 at the downstream end against the urging force of the spring 22. The hydraulic fluid is thus supplied to the downstream circuit 18.

In each of the check valves 15 to 17, the direction in which the hydraulic fluid flows in the through hole 24 coincides with the direction in which the valve body 21 moves to the valve seat 20. This allows the hydraulic fluid to flow without being interfered by the valve body 21 that is moving. Generation of pressure loss is further suppressed.

Regarding each of the check valves 15 to 17, the valve body 21 having the through hole 24, which defines a part of the supply circuit 8, is formed easily simply by providing the seat portion 25 at which the valve body 21 contacts the valve seat 20 and the hollow cylindrical body portion 26.

Each of the check valves 15 to 17 has a double structure including the annular guide member 23 with the insertion hole 24 and the valve body 21. This makes it easy to provide a structure that slidably supports the valve body 21 having the through hole 24 defining a part of the supply circuit 8. Further, the spring 22 is easily installed with respect to the valve body 21 for urging the valve body 21 toward the valve seat 20.

In the illustrated embodiment, the valve unit 3 (the valve units 4, 5) and the hydraulic circuit 1 have the same advantages as those of the check valve 15, which have been described above. That is, the hydraulic fluid is supplied to the downstream circuit 18 through the through hole 24 defined in the valve body 21. Further, the hydraulic fluid is supplied from the remaining portion of the supply circuit 8 (the supply circuit section 8a) other than the through hole 24 to the downstream circuit 18 through the space between the valve body 21 and the valve seat 20. In this manner, a valve unit and a hydraulic circuit capable of reducing pressure loss caused by hydraulic fluid passing through a backflow preventing structure is obtained.

In the hydraulic circuit 1, the valve units 3 to 5 each incorporating the corresponding valve structure (the corresponding check valve 15 to 17) are arranged continuously in such a manner that the valve Structures are located parallel with each other. The supply circuit 8 is thus formed continuously through the valve units 3 to 5. This simplifies a passage configuration that connects upstream portions of the supply circuits 8 of adjacent ones of the valve structures (the check valves 15 to 17) with each other.

Japanese Laid-Open Patent Publication No. 11-315803 discloses a hydraulic circuit having a switch valve for supplying fluid to an actuator (a switch valve 3 provided for a tilt actuator of a forklift) and a valve mechanism (a check valve) for preventing backflow from the switch valve, as shown in FIG. 1 of the document. The hydraulic circuit includes a pressure compensation valve (a bypass type flow control valve 27) in which a first pilot chamber (a pilot chamber 27a) and a second pilot chamber (a pilot chamber 27b) are defined. The first pilot chamber receives pressure from a first passage into which the fluid flows before reaching the switch valve. The second pilot chamber receives pressure from a second passage (a load line 40) into which the fluid flows from the switch valve and urging force generated by a spring. The pressure compensation valve operates in correspondence with urging forces produced by the first and second pilot chambers, thus controlling the flow rate of the fluid supplied to the switch valve. More specifically, in this hydraulic circuit, the pressure compensation valve operates in such a manner as to equilibrate the urging forces of the first pilot chamber and the second pilot chamber. In this manner, the flow rate of the fluid supplied to the switch valve is controlled in correspondence with the operation of the switch valve. However, if relatively great pressure loss is caused in a check valve that prevents backflow from the switch valve, it is necessary to increase the urging force generated by the spring so as to compensate the pressure loss. This may restrict the adjustable range of the flow rate.

Contrastingly, the hydraulic circuit 1 of the illustrated embodiment reduces the pressure loss caused by the hydraulic fluid passing through the backflow preventing structures (the check valves 15 to 17). It is thus unnecessary to increase the urging force of the spring 11c of the pressure compensation valve 11 so as to compensate the pressure loss. Therefore, the urging force acting in the second pilot chamber 11b becomes relatively small. This enlarges a range in which the flow rate can be set. Further, like the illustrated embodiment in which the pressure compensation valve 11 controls the flow rate supplied to each of the switch valves 12 to 14 by switching a connected/disconnected state between the supply circuit 8 and the tank T, the urging force of the spring 11c of the pressure compensation valve 11 becomes relatively small, thus enlarging the range in which the flow rate can be set.

The present examples and embodiments are to be considered as illustrative and not restrictive and the invention is not to be limited to the details given herein, but may be modified within the scope and equivalence of the appended claims. The present invention may be embodied in the following modified forms.

Figure 6:
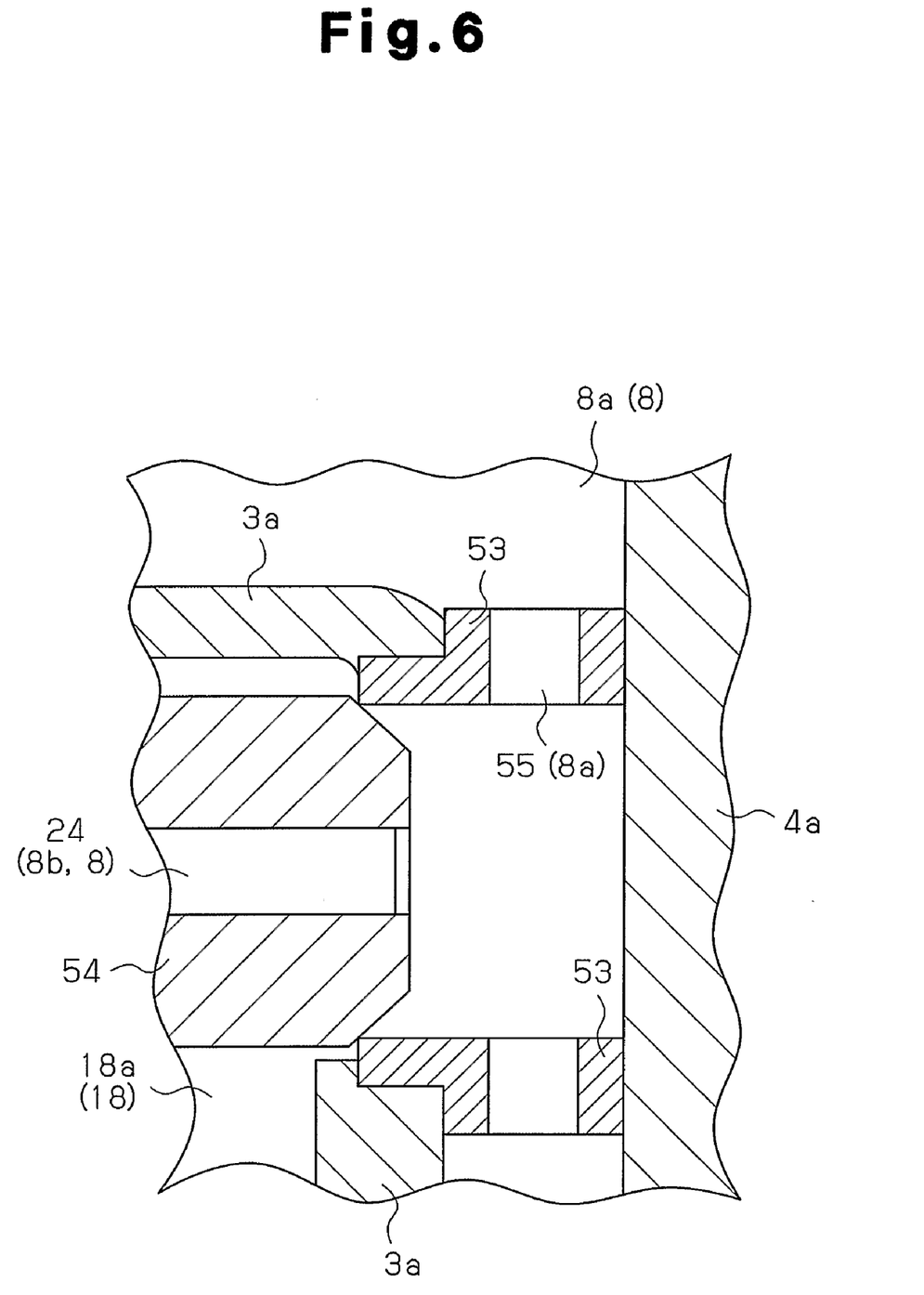
FIG. 6 is a cross-sectional view for explaining a valve structure of a modification.

(1) In each of the valve structures of the illustrated embodiment, the valve seat is formed as a part of the housing of the corresponding valve unit. However, the valve seat may be formed by an independent annular member. FIG. 6 is a cross-sectional view showing a part of a valve structure of such modification. The same reference numerals are given to parts in FIG. 6 that are the same or like corresponding parts of the illustrated embodiment. As shown in FIG. 6, the valve structure of this modification includes a valve seat 53 secured to the lift housing 3a as an independent annular member and a valve body 54 in which the through hole 24 is defined. A communication hole 55, which defines a part of the supply circuit section 8a, is defined in the valve seat 53. Thus, like the hydraulic fluid flowing from the supply circuit section 8b defined by the through hole 24, the hydraulic fluid flowing from the supply circuit section 8a is supplied to the downstream circuit section 18a through the space between the valve seat 53 and the valve body 54.

In the example of FIG. 6, the valve body 54 is installed in the housing 3a, in which the valve structure is to be accommodated, before the valve seat 53 is secured to the housing 3a. The valve seat 53, which is the independent annular member, is then secured to the housing 3a in such a manner that the valve body 54 is allowed to contact an annular end portion of the valve seat 53. That is, the valve seat 53 formed by the independent annular member simplifies the structure that slidably supports the valve body 54 having the through hole 24, which defines a part of the supply circuit 8. Further, as shown in FIG. 6, the valve seat 53 may be clamped between the housing 3a and the adjacent housing 4a.

(2) In the illustrated embodiment, the present invention is applied to the loading device of the forklift. However, the present invention is not limited to this but may be generally applied to different purposes. That is, the present invention may be applied to a different hydraulic circuit of the forklift other than the hydraulic circuit. The present invention may be applied also to a hydraulic circuit of apparatuses other than forklifts.

(3) In the illustrated embodiment, the valve structure has the seat portion at which the valve structure contacts the valve seat and the hollow cylindrical body portion. However, the present invention is not limited to this. Further, the present invention is not limited to the valve structure that forms the double structure together with the annular guide member.

The invention claimed is:

1. A hydraulic circuit comprising a plurality of valve units that are provided continuously, wherein each of the valve units includes:
   an upstream supply circuit;
   a downstream circuit;
   a valve structure permitting forward flow of a fluid from the supply circuit to the downstream circuit but prohibiting backflow of the fluid from the downstream circuit to the supply circuit; and
   a housing incorporating the valve structure,
   wherein the valve structures of the valve units are arranged parallel with each other,
   wherein the valve structure of each valve unit includes:
   a valve seat arranged between the supply circuit of the same valve unit and the downstream circuit of the same valve unit;
   a valve body blocking a flow of the fluid between the supply circuit and the downstream circuit by contacting the valve seat, and connecting the supply circuit to the downstream circuit for supplying the fluid to the downstream circuit by separating from the valve seat; and
   a through hole extending through the valve body and defining a part of the supply circuit,
   the through hole being defined in such a manner that the fluid that has passed through the through hole flows in a space between the valve seat and the valve body and is thus supplied to the downstream circuit,
   wherein each valve unit includes a passage provided separately from the through hole of the same valve unit in such a manner as to merge a flow of the fluid sent from the through hole with a flow of the fluid in the passage, the passage of each valve unit defining a part of the supply circuit of the same valve unit and being formed continuously with the passage of another valve unit; and
   wherein the valve body is formed in such a manner that a pressure receiving area at an upstream side of the through hole is smaller than a pressure receiving area at a downstream side of the through hole.

2. The hydraulic circuit according to claim 1, wherein the valve structure of each valve unit further includes an elastic member for urging the valve body toward the valve seat.

3. The hydraulic circuit according to claim 1, wherein the through hole of each valve structure extends parallel with a direction in which the valve body of the same valve structure moves toward the valve seat of the same valve structure.

4. The hydraulic circuit according to claim 1, wherein the valve body of each valve structure includes a seat portion and a hollow cylindrical body portion, the valve body contacting the valve seat of the same structure at the seat portion, the body portion having a diameter smaller than the diameter of the seat portion.

5. The hydraulic circuit according to claim 1, further comprising an annular guide member having an insertion hole, the valve body being inserted into the guide member through the insertion hole in such a manner that the valve body is slidably received in the guide member.

6. The hydraulic circuit according to claim 2, wherein the valve structure of each valve unit further includes an annular guide member having an insertion hole, the valve body of the same valve structure being inserted into the guide member through the insertion hole in such a manner that the valve body is slidably received in the guide member, the elastic member of the same valve structure being formed by a spring urging the valve body toward the valve seat of the same valve structure with respect to the guide member.

7. The hydraulic circuit according to claim 1, wherein the valve seat of each valve structure is formed by an independent annular member.

8. The hydraulic circuit according to claim 1, further comprising:
   a switch valve arranged in the downstream circuit of each valve unit, the switch valve controlling supply of the fluid to an actuator; and
   a pressure compensation valve, wherein the pressure compensation valve includes a first pilot chamber and a second pilot chamber, the first pilot chamber receiving a fluid pressure from a first passage into which the fluid flows before reaching the switch valves, the second pilot chamber receiving a fluid pressure from a second passage into which the fluid flows after passing through the switch valves and urging force generated by a spring, and wherein the pressure compensation valve controls a flow rate of the fluid supply to the switch valves in correspondence with urging forces generated by the first and second pilot chambers.

9. The hydraulic circuit according to claim 8, wherein the fluid is introduced from the supply circuits to the first passage, the fluid is introduced from the downstream circuits to the second passage, and the pressure compensation valve controls the flow rate of the fluid supply to the switch valves by changing a communication state of the supply circuits with respect to a tank in correspondence with the urging forces generated by the first and second pilot chambers.

10. The hydraulic circuit according to claim 2, wherein the through hole of each valve structure extends parallel with a direction in which the valve body of the same valve structure moves toward the valve seat of the same valve structure.

11. The hydraulic circuit according to claim 2, wherein the valve body of each valve structure includes a seat portion and a hollow cylindrical body portion, the valve body contacting the valve seat of the same valve structure at the seat portion, the body portion having a diameter smaller than the diameter of the seat portion.

12. The hydraulic circuit according to claim 3, wherein the valve body of each valve structure includes a seat portion and a hollow cylindrical body portion, the valve body contacting the valve seat of the same valve structure at the seat portion, the body portion having a diameter smaller than the diameter of the seat portion.

13. The hydraulic circuit according to claim 2, further comprising an annular guide member having an insertion hole, the valve body being inserted into the guide member through the insertion hole in such a manner that the valve body is slidably received in the guide member.

14. The hydraulic circuit according to claim 3, further comprising an annular guide member having an insertion hole, the valve body being inserted into the guide member through the insertion hole in such a manner that the valve body is slidably received in the guide member.

15. The hydraulic circuit according to claim 4, further comprising an annular guide member having an insertion hole, the valve body being inserted into the guide member through the insertion hole in such a manner that the valve body is slidably received in the guide member.

16. The hydraulic circuit according to claim 2, wherein the valve seat is formed by an independent annular member.

17. The hydraulic circuit according to claim 3, wherein the valve seat of each valve structure is formed by an independent annular member.

* * * * *